US011251006B2

(12) United States Patent
Marot et al.

(10) Patent No.: US 11,251,006 B2
(45) Date of Patent: Feb. 15, 2022

(54) ELECTRICAL POWER CONTACTOR AND VEHICLE INCLUDING SUCH A CONTACTOR

(71) Applicants: Airbus SAS, Blagnac (FR); VOLTAIR, Suresnes (FR)

(72) Inventors: Christian Marot, Toulouse (FR); Phi Hung Nguyen, Choisy le Roi (FR)

(73) Assignee: AIRBUS SAS, Blagnac (FR)

( * ) Notice: Subject to any disclaimer, the term of this patent is extended or adjusted under 35 U.S.C. 154(b) by 417 days.

(21) Appl. No.: 16/470,421

(22) PCT Filed: Dec. 14, 2017

(86) PCT No.: PCT/FR2017/053578
§ 371 (c)(1),
(2) Date: Dec. 27, 2019

(87) PCT Pub. No.: WO2018/109404
PCT Pub. Date: Jun. 21, 2018

(65) Prior Publication Data
US 2020/0227223 A1    Jul. 16, 2020

(30) Foreign Application Priority Data
Dec. 16, 2016   (FR) ...................................... 1662604

(51) Int. Cl.
*H01H 50/04*       (2006.01)
*B64D 41/00*       (2006.01)
(Continued)

(52) U.S. Cl.
CPC ........... *H01H 50/045* (2013.01); *B64D 41/00* (2013.01); *H01H 47/22* (2013.01); *H01H 50/541* (2013.01); *B64D 2221/00* (2013.01)

(58) Field of Classification Search
CPC .... H01H 50/045; H01H 47/22; H01H 50/541; H01H 47/00; H01H 9/54; H01H 9/12; B64D 41/00; B64D 2221/00
See application file for complete search history.

(56) References Cited

U.S. PATENT DOCUMENTS

| 2,821,666 A | 1/1958 | Austin |
| 5,301,083 A * | 4/1994 | Grass ..................... H01H 89/06 |
| | | 361/64 |

(Continued)

FOREIGN PATENT DOCUMENTS

| DE | 2103292 A1 | 8/1972 |
| FR | 2820900 A1 | 8/2002 |
| FR | 2952131 A1 | 5/2011 |

OTHER PUBLICATIONS

IP.COM Search Results.*

(Continued)

*Primary Examiner* — Mohamad A Musleh
(74) *Attorney, Agent, or Firm* — Greer, Burns & Crain, Ltd.

(57) ABSTRACT

An electrical power contactor including a local electrical ground plane configured to be electrically connected to a reference potential 0Vdc of an electrical power supply of the power contactor. Current returns from at least one coil and from at least one auxiliary contact of the electrical power contactor are formed by a common conductor that is connected to the local electrical ground plane. A current return from a controller of the electrical power contactor is also connected to the local electrical ground plane.

11 Claims, 4 Drawing Sheets

(51) Int. Cl.
*H01H 47/22* (2006.01)
*H01H 50/54* (2006.01)

(56) References Cited

U.S. PATENT DOCUMENTS

2004/0066592 A1  4/2004 Haudry et al.
2004/0252421 A1* 12/2004 Knox, Jr. ............... H01R 11/03
                                                    361/23

OTHER PUBLICATIONS

Global Dossier.*
International Search Report; priority document dated Jan. 24, 2018.

* cited by examiner

ELECTRICAL POWER CONTACTOR AND VEHICLE INCLUDING SUCH A CONTACTOR

CROSS-REFERENCES TO RELATED APPLICATIONS

This application claims the benefit of the International Application No. PCT/FR2017/053578, filed on Dec. 14, 2017, and of the French patent application No. 1662604 filed on Dec. 16, 2016, the entire disclosures of which are incorporated herein by way of reference.

FIELD OF THE INVENTION

The invention belongs to the field of power supply distribution networks.

More particularly, the invention belongs to the field of onboard power distribution in vehicles.

More particularly, the invention relates to an electrical power contactor, for example a contactor used in an aircraft.

BACKGROUND OF THE INVENTION

In vehicle power distribution networks, the return of the currents carried by the phases or the positive of the power supply is generally performed by a dedicated separate conductor, neutral or reference potential to the power supply, separately from the electrical ground of the vehicle structure.

This configuration illustrated in the exemplary setup of a contactor 100 illustrated in FIG. 1 is used, in particular, when the qualities required for the circuits for supplying power to equipment are incompatible with a nominal current return via the vehicle structure used as an electrical ground.

It is also required when the electrical continuity of the structure is not guaranteed with sufficiently low resistance, which is observed in structures resulting from the assembly of numerous metal parts, for example aircraft with a metal structure, or for modern aircraft with the increasing use of nonconductive structures, or structures that are unsuitable for conducting electricity, for example structures made of composite materials.

Such a configuration involves a substantial number of component-to-component and component-to-system interfaces, resulting in complexity and a high weight of wiring, as well as a risk of electromagnetic coupling due to radiating radiofrequency current loops.

The issue of weight is critical in aeronautics. Furthermore, any malfunctioning of onboard systems that would be attributable to electromagnetic coupling between the elements of the system should be limited to the greatest possible extent.

The invention provides an electrical power contactor that decreases the complexity of the internal wiring, thus allowing the consequences inherent to the issue mentioned above to be limited and the reliability of the setup to be improved.

SUMMARY OF THE INVENTION

The invention relates to an electrical power contactor intended to be connected to a DC electrical power supply maintaining a difference in potential between a terminal at a potential Vdc and a terminal at a reference potential 0 Vdc. The electrical power contactor according to the invention includes:

at least one coil arranged to actuate at least one power contact; and at least one controller supplying the at least one coil with a voltage+Vdc delivered by the electrical power supply; and at least one auxiliary contact actuated by the at least one coil, a terminal of the at least one auxiliary contact being connected to an input of the controller so as to define a voltage on the input.

The at least one power contact, the at least one coil and the at least one auxiliary contact are enclosed in a mechanical housing.

The electrical power contactor further includes a local electrical ground plane intended to be electrically connected to the reference potential 0 Vdc of the electrical power supply and to an electrical ground outside the electrical power contactor.

Current returns from the at least one coil and from the at least one auxiliary contact are formed by a common conductor that is connected to the local electrical ground plane.

A current return from the at least one controller is connected to the local electrical ground plane.

In one embodiment, the mechanical housing is connected to the local electrical ground plane by an independent conductor.

In one embodiment, the mechanical housing is connected to the local electrical ground plane by the common conductor connecting the current returns from the at least one coil and from the at least one auxiliary contact to the local electrical ground plane.

In one embodiment, a distance from the local electrical ground plane to the at least one controller and a distance from the local electrical ground plane to a mechanical housing comprising the switching elements is shorter than or equal to 30 cm.

In one embodiment, the resistance between any two points on the local electrical ground plane is lower than 10 µΩ, preferably lower than 2 µΩ.

In one embodiment, the local electrical ground plane is a rectangular plate of a material having a resistivity that is lower than or equal to 10-6Ω.m, a thickness e that is greater than or equal to 0.10 mm, preferably equal to 0.5 mm, and a ratio ℓ/L of a plate width ℓ to a plate length L of which is higher than or equal to ⅔ and lower than or equal to 1.

In one embodiment, the local electrical ground plane is substantially square in shape.

The invention also relates to an aircraft including at least one electrical power contactor according to the invention.

In one embodiment, the aircraft further includes a general electrical ground plane responsible for the current returns for the aircraft and to which the local electrical ground plane of the at least one power contactor is connected.

BRIEF DESCRIPTION OF THE DRAWINGS

The invention will be better understood upon reading the following description and upon examining the accompanying figures. These are provided only by way of completely nonlimiting indication of the invention.

DETAILED DESCRIPTION OF THE PREFERRED EMBODIMENTS

Figure 1:
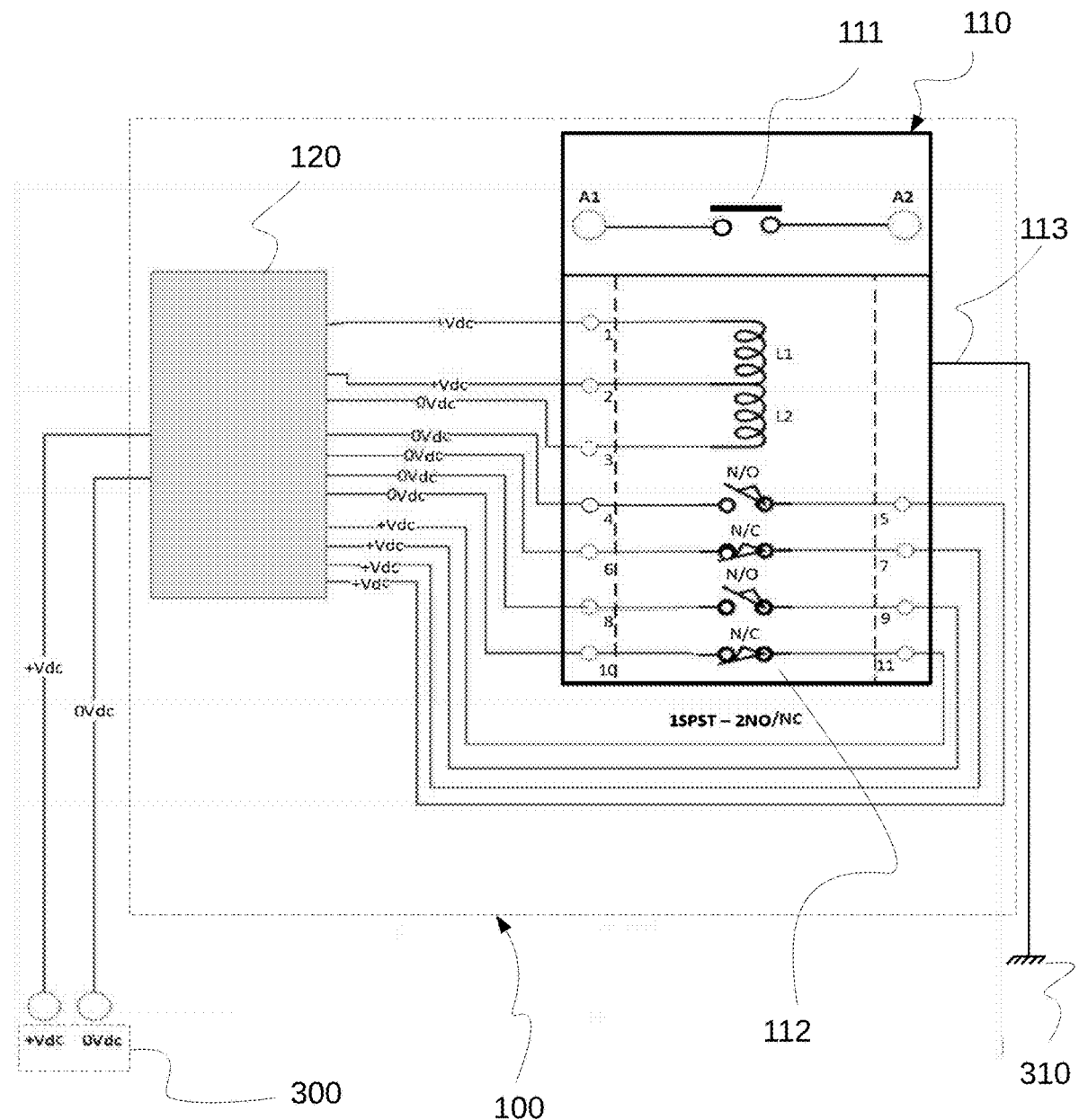
FIG. 1, cited above, shows a power contactor of the prior art.

FIG. 1 shows the wiring diagram of a contactor 100 of the prior art, conventionally used in an onboard electrical system of an aircraft.

The power contactor 100 illustrated here is an SPST-2NO-2NC contactor.

It comprises:
a mechanical housing 110 enclosing:
a single-pole single-throw power contact 111 including a first terminal A1 and a second terminal A2;
four auxiliary contacts 112, of which two are "normally open" NO auxiliary contacts and two are "normally closed" NC auxiliary contacts;
an inrush coil L2 through which an inrush and/or a holding current for the contacts is liable to flow;
a holding coil L1+L2 through which a holding current is liable to flow;
a controller 120.

The inrush current that is liable to flow through the inrush L2 and holding L1+L2 coils in order to close the power contact 111 is sometimes 10 times as high as the holding current that is liable to flow through the holding coil L1+L2 in order to hold the power contact closed. For example, the inrush current may be 4 A and the holding current may be 0.4 A, which justifies the use of two coils to limit power consumption and heating over long periods of power contactor excitation.

These features of a contactor are presented here only by way of nonlimiting example of a contactor which may have a plurality of normally open or normally closed power contacts, and a different number of normally open or normally closed secondary contacts.

The power contactor 100 has:
six terminals 1, 2, 5, 7, 9, 11 that are liable to be subjected to a potential Vdc, each being uniquely associated with one of the coils L1, L2 or with one of the auxiliary contacts;
five terminals 3, 4, 6, 8 and 10 that are liable to be subjected to a reference potential 0 dc, the terminal 3 being associated with the coils, the other terminals each being uniquely associated with one auxiliary contact.

The terminals 1 to 11 are connected electrically and individually to the controller 120.

The mechanical housing 110 that contains, in particular, the switching elements, i.e., the coils and the auxiliary contacts, is also connected to an electrical ground 310 by a grounding conductor 113 so as to channel leakage currents away and avoid a buildup of electric charge on the housing implemented with electromagnetic shielding.

Regarding the controller 120, it is supplied with voltage by a power supply 300 having a supply potential +Vdc and a reference potential 0 Vdc.

It is noted in particular that the power contactor 100 comprises six returns to the reference potential 0 Vdc.

These features of the contactor of the prior art are recalled for the purpose of better highlighting the configuration of a contactor of the invention which, for the sake of comparison, will be illustrated with equivalent capabilities.

Figure 2:
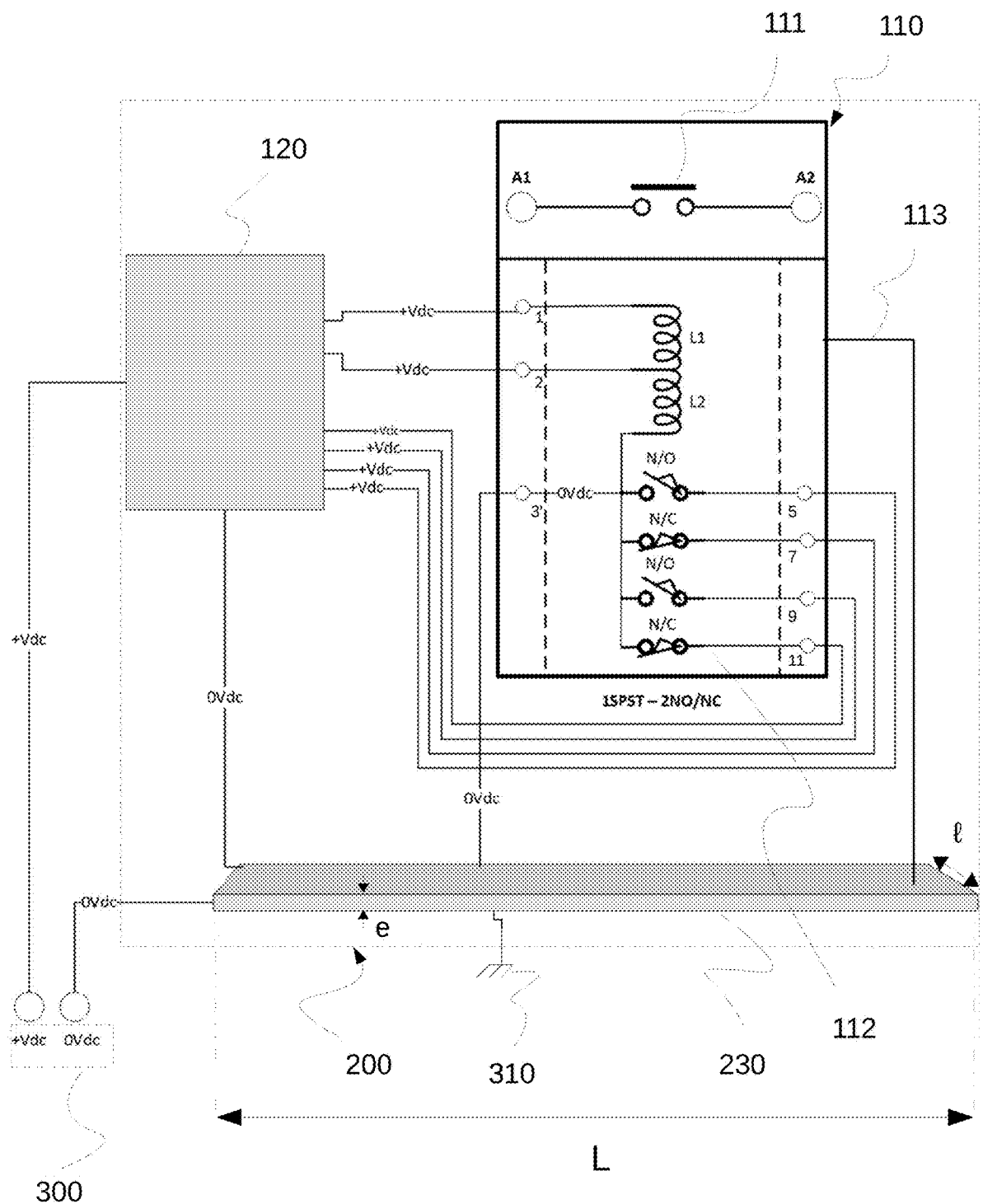
FIG. 2 shows an electrical power contactor according to the invention in a first embodiment.

FIG. 2 shows a power contactor 200 according to the invention. It comprises:
a mechanical housing 110 enclosing:
an SPST power contact 111 including a first terminal A1 and a second terminal A2;
four auxiliary contacts 112, of which two are "normally open" NO auxiliary contacts and two are "normally closed" NC auxiliary contacts;
an inrush coil L2 through which an inrush and/or a holding current for the contacts is liable to flow;
a holding coil L1+L2 through which a holding current is liable to flow;
a controller 120; and
a local electrical ground plane 230 connected to an electrical ground 310 outside the power contactor 200.

The local electrical ground plane 230 comprises a material that is a good conductor of electricity, for example copper.

The connections to the reference potential 0 Vdc that are associated with the coils L1, L2 and with the auxiliary contactors of the power contactor 200 are grouped together, inside the mechanical housing 110 of the contactor, as close as possible to the auxiliary contacts and to the coils L1, L2 on a single connection terminal 3'.

A single common conductor, for example an electrical cable, is used to connect the connection terminal 3' to the local electrical ground plane 230. The controller 120 and the mechanical housing 110 are connected to the local electrical ground plane independently of the common conductor.

Because of the arrangement of the elements that have to be connected to the local electrical ground, using a flexible braided electrical connector as a local electrical ground would require a flexible braided connector having a length of more than 30 cm. The resistance of a flexible braided connector of such length is too high for the flexible braided connector to constitute an effective electrical ground plane.

Advantageously, the local electrical ground plane 230 substantially takes the shape of a rectangular plate, the thickness e of which is at least 0.1 mm and preferably equal to 0.5 mm, and the length L and the width $\ell$ of which are such that a ratio $\ell/L$ is higher than two thirds and lower than or equal to 1. Preferably, the plate is substantially square in shape. Such features make it possible to obtain a resistance between any two points on the electrical ground plane that is low enough to decrease the risk of interference through common impedance when a plurality of signals share the same electrical return ground to a level that is compatible with the requirements of the onboard equipment. The use of a plate instead of a flexible braided connector allows the number of multi-contact connections to be limited, thus avoiding local increases in electrical resistance, at the connection points, and also avoiding a decrease in the reliability of the electrical system.

In practice, the expression "resistance that is low enough" is understood to mean a resistance of less than 10 $\mu\Omega$, preferably less than 2 $\mu\Omega$. To obtain such a resistance, the at least one electrical ground plane 230 could comprise a material that is a good conductor of electricity, for example copper. The expression "material that is a good conductor" should be taken according to the meaning commonly understood by those skilled in the art of power distribution systems. In general, a material exhibiting a resistivity of less than $10^{-6}$ $\Omega.m$ under operating conditions is considered to be a "good conductor".

Advantageously, the local electrical ground plane 230 is located as close as possible to the mechanical housing 110 and to the controller 120 so as to limit the length, and hence the weight, of the cables used. Preferably, the arrangement of the local electrical ground plane 230 is such that the conductive cables used to connect the connection terminal 3', the mechanical housing 110 and the controller 120 are less than 30 cm in length.

In one unillustrated embodiment, the local electrical ground plane 230 of one contactor according to the invention may be used as the local electrical ground plane 230 for another contactor 200 according to the invention, in particular in the situation of an electrical cabinet including a plurality of electrical contactors.

In the illustrated example, by grouping together the current returns of the contactor 200 in this way, the number of cables used is decreased fourfold, changing from:

one cable used initially for connecting the coils to the reference potential;

four cables used initially for connecting the terminals of the auxiliary contacts to the reference potential 0 Vdc;

to a single cable used for all of these connections.

Figure 3:
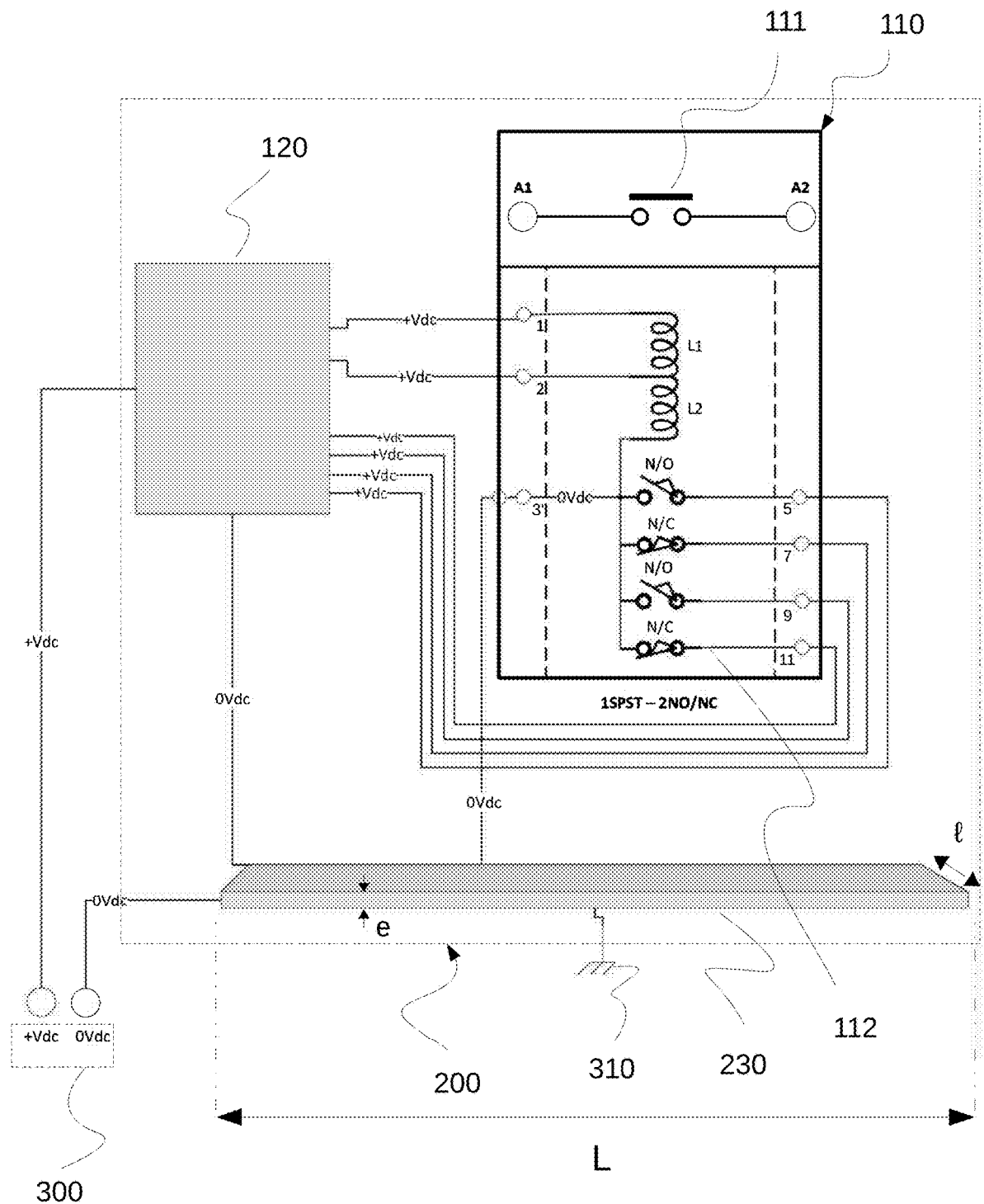
FIG. 3 shows an electrical power contactor according to the invention in a second embodiment.

In one embodiment illustrated in FIG. 3, the single common conductor used to connect the connection terminal 3' to the local electrical ground plane 230 is also used to connect the mechanical housing 110 to the local electrical ground plane.

The assembly according to the invention therefore allows the power contactor 200 to be internally wired using the local electrical ground plane 230.

Limiting the number of cables makes it possible to limit, by around 30% in practice, the weight of wiring used in the contactor 200, and to minimize radiating radiofrequency current loops, thus decreasing the risk of electromagnetic coupling that may lead to the electrical system malfunctioning.

Figure 4:
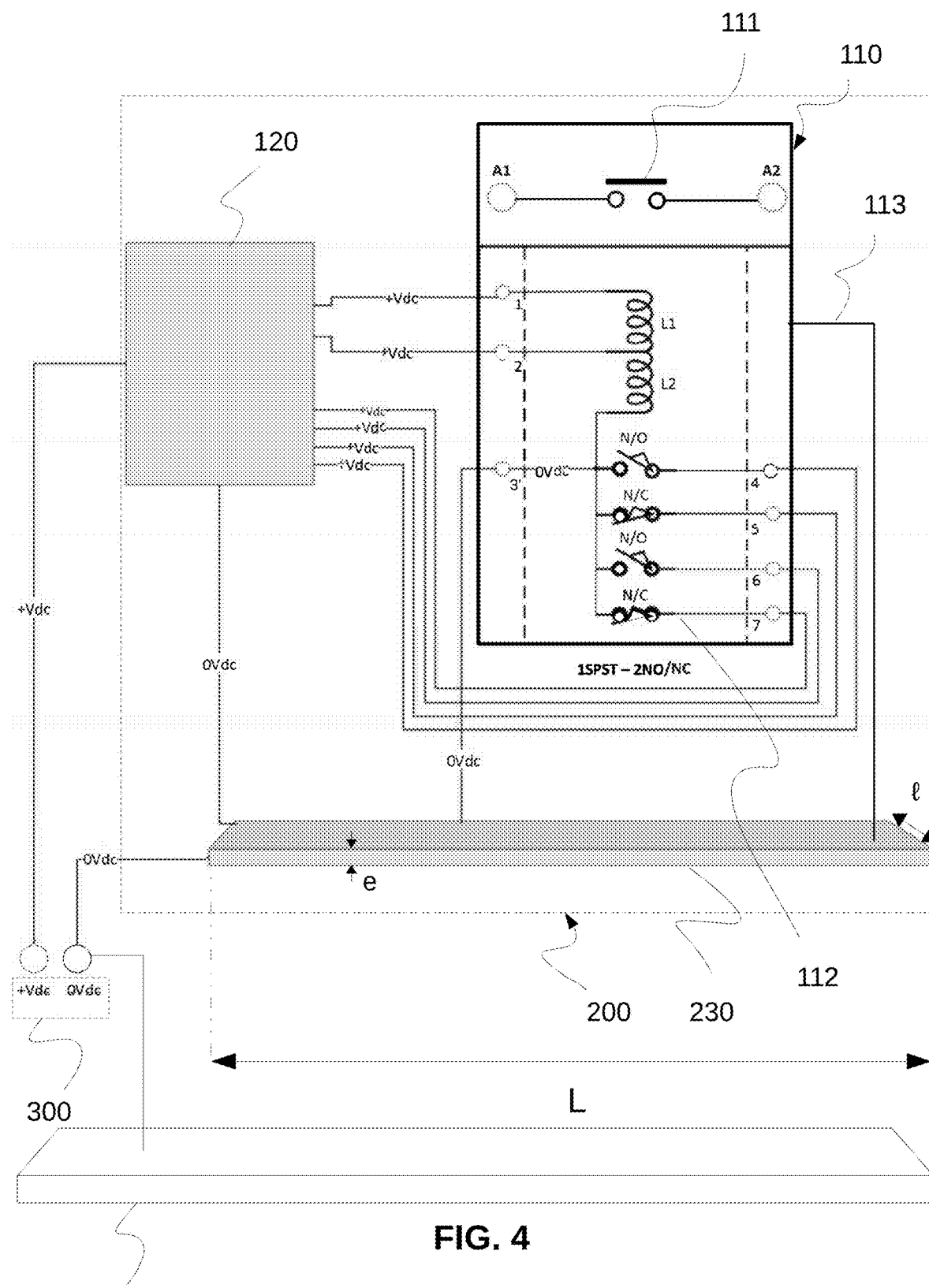
FIG. 4 shows the power contactor in the embodiment of FIG. 2, a reference potential of the power supply of which is connected to a general ground plane.

The invention such as described here is suitable for any type of vehicle, and, in particular, for aircraft with a structure principally made of composite materials. Specifically, such aircraft are provided with a general electrical ground plane 400 because leakage currents, which are always possible, are liable to damage the structure. The electrical power contactor 200 according to the invention may advantageously be used in such an aircraft, the electrical ground plane of which acts as the general electrical ground plane 400 as illustrated in FIG. 4, to which the reference potential of the local ground plane 230 is returned via the power supply 300. The electrical ground 310 of the embodiment of FIG. 2 is here advantageously replaced with the general electrical ground plane 400.

However, it should be noted that the invention is not limited just to the field of aeronautics of the embodiment described here, but could be adapted for other industrial fields such as for example the automotive field.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical power contactor configured to be connected to a DC electrical power supply maintaining a difference in potential between a terminal at a potential Vdc and a terminal at a reference potential 0 Vdc, said electrical contactor including:

at least one coil arranged to actuate at least one power contact;

at least one controller supplying said at least one coil with a voltage +Vdc delivered by the electrical power supply; and at least one auxiliary contact actuated by said at least one coil, a terminal of said at least one auxiliary contact being connected to an input of said controller so as to define a voltage on said input;

the at least one power contact, the at least one coil and the at least one auxiliary contact being enclosed in a mechanical housing, said electrical power contactor being characterized in that:

the electrical power contactor further includes a local electrical ground plane configured to be electrically connected to the reference potential 0 Vdc of the electrical power supply and to an electrical ground outside the electrical power contactor;

current returns from the at least one coil and from the at least one auxiliary contact are formed by a common conductor that is connected to said local electrical ground plane; and a current return from the at least one controller is connected to said local electrical ground plane.

2. The electrical power contactor according to claim 1, wherein the mechanical housing is connected to the local electrical ground plane by an independent conductor.

3. The electrical power contactor according to claim 1, wherein the mechanical housing is connected to the local electrical ground plane by the common conductor connecting the current returns from the at least one coil and from the at least one auxiliary contact to said local electrical ground plane.

4. The electrical power contactor according to claim 1, wherein a distance from the local electrical ground plane to the at least one controller and a distance from the local electrical ground plane to the mechanical housing comprising switching elements is shorter than or equal to 30 cm.

5. The electrical power contactor according to claim 1, wherein a resistance between any two points on the local electrical ground plane is lower than 10 µΩ.

6. The electrical power contactor according to claim 1, wherein a resistance between any two points on the local electrical ground plane is lower than 2 µΩ.

7. The electrical power contactor according to claim 1, wherein the local electrical ground plane is a rectangular plate of a material having a resistivity that is lower than or equal to $10^{-6}$ Ω.m, a thickness that is greater than or equal to 0.10 mm, and a ratio of a plate width to a plate length which is higher than or equal to $\frac{2}{3}$ and lower than or equal to 1.

8. The electrical power contactor according to claim 7, wherein the thickness of the rectangular plate is 0.5 mm.

9. The electrical power contactor according to claim 7, wherein the local electrical ground plane is substantially square in shape.

10. An aircraft including at least one electrical power contactor according to claim 1.

11. The aircraft according to claim 10, further including a general electrical ground plane responsible for the current returns for the aircraft and to which the local electrical ground plane of the at least one power contactor is connected.

* * * * *